US008113233B2

(12) United States Patent
Jeon

(10) Patent No.: US 8,113,233 B2
(45) Date of Patent: Feb. 14, 2012

(54) HYDRAULIC CIRCUIT OF OPTION DEVICE FOR EXCAVATOR

(75) Inventor: Man Suk Jeon, Kyungsangnam-do (KR)

(73) Assignee: Volvo Construction Equipment Holding Sweden AB, Eskilstuna (SE)

(*) Notice: Subject to any disclaimer, the term of this patent is extended or adjusted under 35 U.S.C. 154(b) by 1181 days.

(21) Appl. No.: 11/821,109

(22) Filed: Jun. 21, 2007

(65) Prior Publication Data

US 2008/0053538 A1 Mar. 6, 2008

(30) Foreign Application Priority Data

Aug. 29, 2006 (KR) ........................ 10-2006-0082265

(51) Int. Cl.
*F16K 31/124* (2006.01)

(52) U.S. Cl. ...................... 137/491; 137/489.5; 137/492

(58) Field of Classification Search .................. 137/487, 137/488, 489, 491, 492, 492.5, 596.14
See application file for complete search history.

(56) References Cited

U.S. PATENT DOCUMENTS 3,952,771 A * 4/1976 Lang ............................ 137/491
4,531,543 A * 7/1985 Markley ..................... 137/515.7
5,083,430 A * 1/1992 Hirata et al. .................... 60/445
5,137,254 A * 8/1992 Aardema et al. ................ 251/35
5,207,059 A * 5/1993 Schexnayder .................. 60/465
2006/0266419 A1* 11/2006 Krug-Kussius ............... 137/491
2007/0175521 A1* 8/2007 Krug-Kussius ............... 137/487

* cited by examiner

*Primary Examiner* — John Rivell
*Assistant Examiner* — William McCalister
(74) *Attorney, Agent, or Firm* — Ladas & Parry LLP

(57) ABSTRACT

A hydraulic circuit of an option device for an excavator is disclosed, which can constantly supply hydraulic fluid to an option device, such as a breaker and so on, selectively mounted on the excavator, irrespective of the size of a load occurring when the option device operates, and control respective flow rates required for various kinds of option devices. The hydraulic circuit includes a variable hydraulic pump, an option device, a first spool shifted to control hydraulic fluid fed to the option device, a poppet and a piston, an option spool shifted to control hydraulic fluid fed to the option device via the first spool, a second spool shifted to control hydraulic fluid fed to a back pressure chamber of the poppet, and a control means installed in the poppet and controlling hydraulic fluid passing through an orifice of the poppet when the piston and the poppet are pressed by the hydraulic fluid fed from the hydraulic pump, through the shifting of the second spool.

3 Claims, 6 Drawing Sheets

HYDRAULIC CIRCUIT OF OPTION DEVICE FOR EXCAVATOR

CROSS-REFERENCE TO RELATED APPLICATION

This application is based on and claims priority from Korean Patent Application No. 10-2006-82265, filed on Aug. 29, 2006 in the Korean Intellectual Property Office, the disclosure of which is incorporated herein in its entirety by reference.

BACKGROUND OF THE INVENTION

1. Field of the Invention

The present invention relates to a hydraulic circuit of an option device for an excavator which can operate an option device such as a breaker, a hammer, a shear, and so forth, mounted on an excavator.

More particularly, the present invention relates to a hydraulic circuit of an option device for an excavator, which can constantly supply hydraulic fluid fed from a hydraulic pump to the option device irrespective of the size of load occurring when the option device operates, and can control respective flow rates required for various kinds of option devices.

2. Description of the Prior Art

As illustrated in FIGS. 1 and 2, a conventional hydraulic circuit of an option device for an excavator includes variable displacement hydraulic pump 26; an option device 24 (e.g., a breaker and so on) connected to the hydraulic pump 26; a first spool 15 installed in a flow path between the hydraulic pump 26 and the option device 24 and shifted to control hydraulic fluid being supplied to the option device 24 through an option port 22 in response to a pilot signal pressure Pi applied thereto; a poppet 14 installed in a flow path between the hydraulic pump 26 and the first spool 15 to control hydraulic fluid fed from the hydraulic pump 26 to the option device 24 when the first spool 15 is shifted; a piston 13 elastically supported in a back pressure chamber 17 of the poppet 14; and a second spool 3 shifted to control hydraulic fluid fed from the hydraulic pump 26 to the back pressure chamber 17 of the poppet 14 through a flow path 23 connected to the back pressure chamber 17, in response to a difference between a pressure of an inlet part of the first spool and a sum of a pressure of an outlet part of the first spool 15 and an elastic force of a valve spring 5.

The conventional hydraulic circuit of an option device for an excavator further includes a first orifice 13*a* formed in the piston 13 and controlling hydraulic fluid fed from the hydraulic pump 26 to the back pressure chamber 17 of the poppet 14 when the second spool 3 is shifted; a second orifice 30 formed in a flow path 23 between the second spool 3 and a back pressure chamber 29 of the piston 13, and controlling hydraulic fluid fed from the hydraulic pump 26 to the back pressure chamber 29 when the second spool 3 is shifted; and a third orifice 31 installed in a flow path 16 having an inlet part connected to a flow path between the first spool 15 and the poppet 14 and an outlet part connected to the second spool 3, and controlling hydraulic fluid which is fed from the hydraulic pump 26 to shift the second spool 3.

In the drawing, reference numeral 19 denotes a pilot flow path connected to a supply line 20 of the hydraulic pump 26 to receive a signal pressure for shifting the second spool 3.

Hereinafter, the operation of the conventional hydraulic circuit of an option device will be described.

As shown in FIGS. 1 and 2, the hydraulic fluid fed from the hydraulic pump 26 is supplied to the supply line 20 and the pilot flow path 19. The hydraulic fluid fed to the supply line 20 pushes the poppet 14 upward as shown in the drawing.

The hydraulic fluid fed to the back pressure chamber 17 of the poppet 14 is supplied to a chamber 21 through an orifice 14*a* of the poppet 14, and thus the poppet 14 is moved upward to be in contact with the piston 13 (in this case, the elastic member 12 is compressed). Accordingly, the hydraulic fluid on the supply line 20 is supplied to the chamber 21.

When the pilot signal pressure Pi is applied to a left port of the first spool 15, the first spool 15 is shifted in the right direction. The hydraulic fluid fed to the chamber 21 is supplied to the option device 24 through the option port 22 to drive the option device 24.

In this case, when the chamber 21 and the option port 22 are connected together by the shifting of the first spool 15 and the hydraulic fluid is supplied to the option device 24, a loss in pressure occurs between a pressure before the hydraulic fluid passes through the second spool 3 and a pressure after the hydraulic fluid passes through the second spool 3.

As illustrated in FIG. 1, the pressure, which is increased due to the shifting of the first spool 15, is supplied to a left end of the second spool 3 along the flow path 16 connected to the chamber 21. When the hydraulic fluid is supplied to the second spool 3 after passing through the third orifice 31 formed at an end part of the flow path 16, the second spool 3 is shifted in the right direction as shown in the drawing (FIG. 2 illustrates the second spool 3 that is shifted in the left direction). In this case, if it is assumed that the cross-sectional area of a diaphragm of the second spool is A1, a force that shifts the second spool 3 in the right direction is (A1×P1).

The pressure in the option port 22 is applied to a right end of the second spool 3 after passing through the pilot flow path 18. Accordingly, the second spool 3 is shifted in the left direction as shown in the drawing (FIG. 2 illustrates the second spool 3 that is shifted in the right direction). In this case, if it is assumed that the cross-sectional area of the diaphragm of the second spool is A2, a force that shifts the second spool 3 in the left direction is (A2×P2)+F1 (which corresponds to the elastic force of the valve spring 5).

That is, the condition that the second spool 3 is kept in its initial state (which corresponds to the state as illustrated in the drawing) is given as (A1×P1)<((A2×P2)+F1), and the condition that the second spool 3 is shifted in the right direction is given as (A1×P1)>((A2×P2)+F1).

In the case of shifting the second spool 3 in the right direction as shown in FIG. 1, the hydraulic fluid is supplied to a left end of the second spool 3 through the flow path 16, and the second spool 3 is shifted in the right direction. The hydraulic fluid fed to the pilot flow path 19 is supplied to the back pressure chamber 29 of the piston 13 after passing through the second spool 3, and a through flow path 23 in order, and thus the piston is moved downward as shown in the drawing. Simultaneously, the poppet 14 elastically installed by the elastic member 12 is moved downward.

The flow path between the supply line 20 and the chamber 21 is blocked by the poppet 14. AS the pressure in the flow path 16 is reduced, the second spool 3 is moved in the left direction as shown in FIG. 1. This corresponds to the state given as (A1×P1)<((A2×P2)+F1).

When the second spool 3 is shifted in the left direction as shown in the drawing, the supply of the pressure in the pilot flow path 19 to the through flow path 23 is intercepted. As the poppet 14 is moved upward as shown in the drawing, the hydraulic fluid fed from the hydraulic pump 26 is supplied to the second spool 3 via the chamber 21 and the flow path 16. This corresponds to the state given as (A1×P1)>((A2×P2)+

F1). Accordingly, the second spool 3 is shifted in the right direction as shown in the drawing.

As illustrated in FIGS. 4A and 4B, a loss in pressure occurring between the signal pressures for shifting the second spool 3 becomes constant due to the repeated shifting of the second spool 3.

That is, it is known that the flow rate Q of the hydraulic fluid being supplied to the option device 24 is Q=(Cd×A×ΔP). Here, Q denotes the flow rate, Cd denotes a flow rate coefficient, A denotes an opening area of a spool (A=constant), and ΔP denotes a loss in pressure between P1 and P2 (ΔP=constant).

As described above, in the conventional hydraulic control valve structure of an option device, the hydraulic fluid fed from the hydraulic pump 26 can be constantly supplied to the option device 24 irrespective of the size of a load occurring in the option device 24.

By contrast, as shown in FIG. 3, the flow rate of the hydraulic fluid being supplied to the option device is overshot (indicated as "a" in the drawing) in an initial control period of the option device, and then is stabilized with the lapse of a predetermined time. This may cause an abnormal operation of the option device in the initial operation period of the option device to lower the stability of the option device.

In addition, option devices have different specifications depending on their manufacturers. Although the flow rate and pressure required for the option devices may differ, the flow rate of the hydraulic fluid being supplied to various kinds of option devices is not controlled, but the same flow rate is always applied thereto.

Accordingly, even an operator having wide experience in operation cannot efficiently manipulate the option devices to lower the workability.

SUMMARY OF THE INVENTION

Accordingly, the present invention has been made to solve the above-mentioned problems occurring in the prior art while advantages achieved by the prior art are maintained intact.

One object of the present invention is to provide a hydraulic circuit of an option device for an excavator, which can constantly supply hydraulic fluid to the option device, irrespective of the size of a load occurring in the option device, to improve the manipulation, and can control respective flow rates required for various kinds of option devices.

In an embodiment of the present invention, the hydraulic circuit can prevent the flow rate from being overshot in an initial control period of the option device, and thus the stability of the option device can be secured.

In order to accomplish these objects, there is provided a hydraulic circuit of an option device for an excavator, according to one aspect of the present invention, which includes a variable hydraulic pump; an option device connected to the hydraulic pump; a first spool installed in a flow path between the hydraulic pump and the option device and shifted to control hydraulic fluid fed from the hydraulic pump to the option device; a poppet installed to open/close a flow path between the hydraulic pump and the first spool and controlling hydraulic fluid fed from the hydraulic pump to the option device when the first spool is shifted, and a piston elastically supported in a back pressure chamber of the poppet; an option spool installed in a flow path between the first spool and the option device and shifted to control hydraulic fluid fed to the option device via the first spool; a second spool shifted to control hydraulic fluid fed from the hydraulic pump to the back pressure chamber of the poppet via a through flow path connected to the back pressure chamber of the poppet, in response to a difference between a pressure of an inlet part of the first spool and a sum of a pressure of an outlet part of the first spool and an elastic force of a valve spring; and a control means installed inside the poppet and controlling hydraulic fluid passing through an orifice of the poppet when the piston and the poppet are pressed by the hydraulic fluid fed from the hydraulic pump, through the shifting of the second spool; wherein in an initial control period of the option device, the flow rate of the hydraulic fluid fed from the back chamber of the poppet to the option device through the shifting of the second poppet is prevented from being increased over a predetermined flow rate set by the control means.

The control means may include a shim placed in an inlet part of the orifice of the poppet and having a through hole formed in the center thereof to be connected to the orifice of the poppet, and a check valve installed inside the orifice of the poppet and having an orifice formed in the center thereof.

The hydraulic circuit of an option device for an excavator may further include a first orifice formed in the piston and controlling the hydraulic fluid fed from the hydraulic pump to the back pressure chamber of the poppet when the second spool is shifted; a second orifice formed in a flow path between the second spool and the back pressure chamber of the piston and controlling the hydraulic fluid fed from the hydraulic pump to the back pressure chamber of the piston when the second spool is shifted; and a third orifice installed in a flow path having an inlet part connected to a flow path between the first spool and the poppet and an outlet part connected to the second spool, and controlling the hydraulic fluid fed from the hydraulic pump to shift the second spool.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 5:
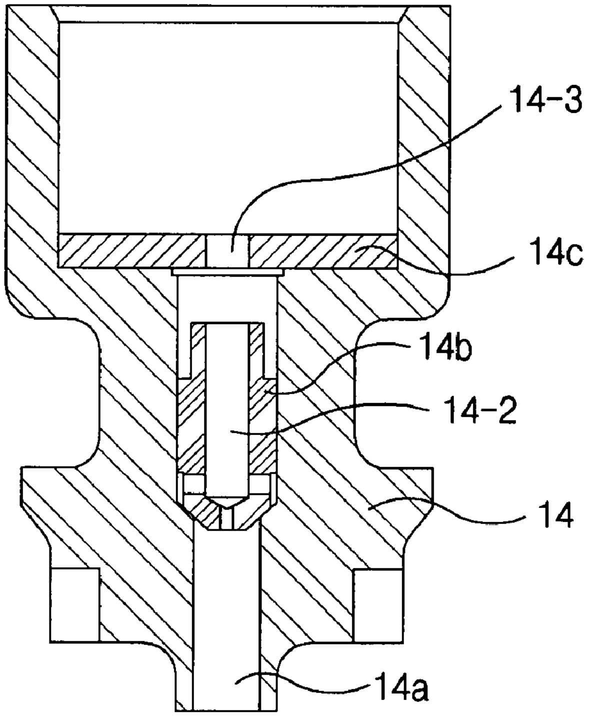
FIG. 5 is a sectional view of main parts extracted from a hydraulic circuit of an option device for an excavator according to an embodiment of the present invention.
Figure 6:
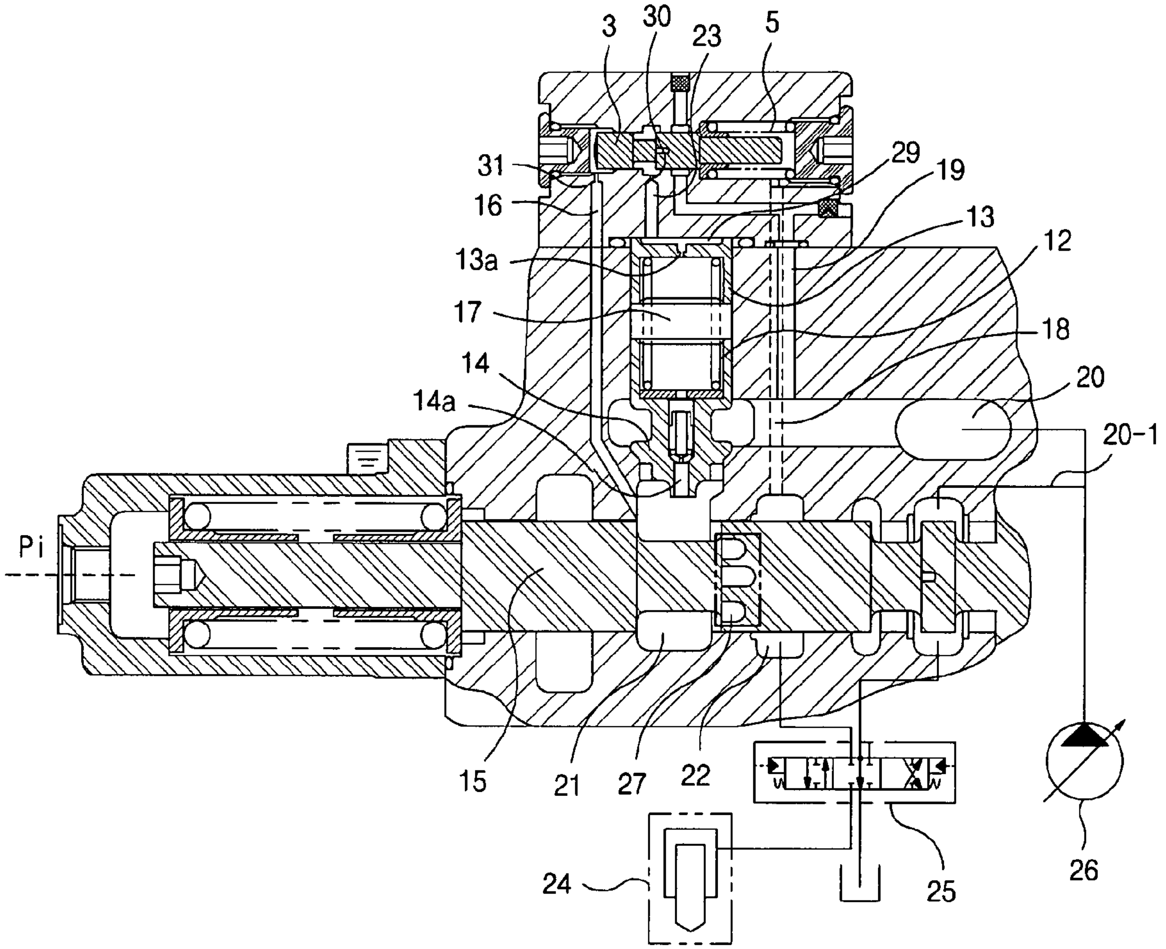
FIG. 6 is a sectional view of a flow rate control valve in a hydraulic circuit of an option device for an excavator according to an embodiment of the present invention.
Figure 7:
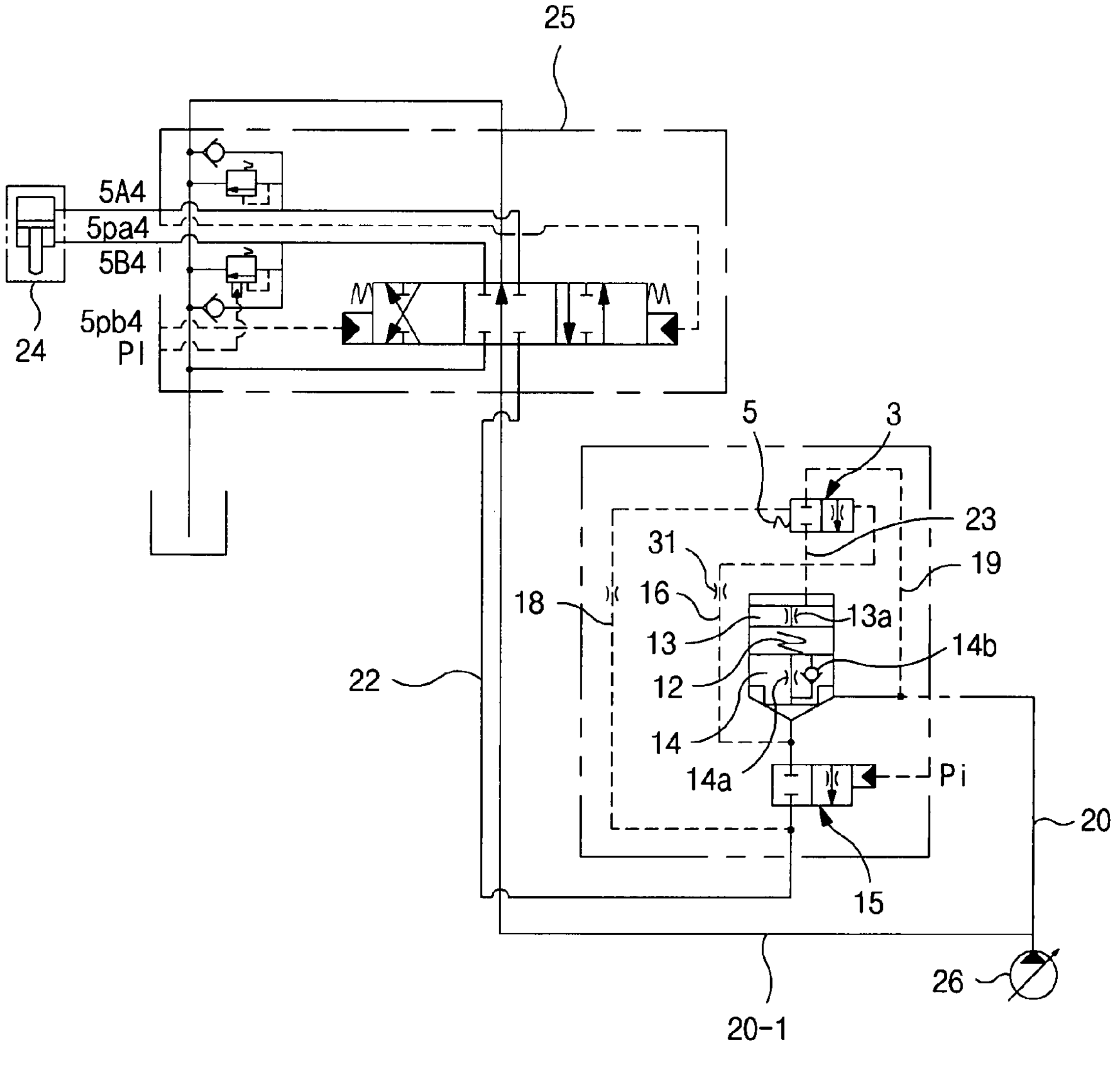
FIG. 7 is a hydraulic circuit diagram of an option device for an excavator according to an embodiment of the present invention.

As shown in FIGS. 5 to 7, a hydraulic circuit of an option device for an excavator according to an embodiment of the present invention includes a variable hydraulic pump 26; an option device 24 (e.g., a hammer, a shear, a breaker, and so forth) connected to the hydraulic pump 26; a first spool 15 installed in a flow path between the hydraulic pump 26 and the option device 24 and shifted to control hydraulic fluid being supplied from the hydraulic pump 26 to the option device 24 in response to a pilot signal pressure Pi applied thereto; a poppet 14 installed to open/close a flow path 20 between the hydraulic pump 26 and the first spool 15 and controlling hydraulic fluid fed from the hydraulic pump 26 to the option device 24 when the first spool 15 is shifted, and a piston 13 elastically supported by an elastic member 12 (e.g., a compression coil spring) in a back pressure chamber 17 of the poppet 14; an option spool 25 installed in a flow path 22 between the first spool 15 and the option device 24 and shifted to control hydraulic fluid fed to the option device 24 via the first spool 15 in response to pilot signal pressures 5*pa*4 and 5*pb*4; a second spool 3 shifted to control hydraulic fluid fed from the hydraulic pump 26 to the back pressure chamber 17 of the poppet 14 via a through flow path 23 connected to the back pressure chamber 17 of the poppet 14, in response to a difference between a pressure of an inlet part of the first spool 15 and a sum of a pressure of an outlet part of the first spool 15 and an elastic force of a valve spring 5; and a control means installed inside the poppet 14 and controlling hydraulic fluid passing through an orifice 14*a* of the poppet 14 when the piston 13 and the poppet 14 are pressed by the hydraulic fluid fed from the hydraulic pump 26, through the shifting of the second spool 3.

The control means includes a shim 14*c* placed on an inlet part of the orifice 14*a* of the poppet and having a through hole 14-3 formed in the center thereof to be connected to the orifice 14*a* of the poppet 14, and a check valve 14*b* installed inside the orifice 14*a* of the poppet 14 and having an orifice 14-2 formed in the center thereof.

The hydraulic circuit of an option device for an excavator according to an embodiment of the present invention further includes a first orifice 13*a* formed in the piston 13 and controlling the hydraulic fluid fed from the hydraulic pump 26 to the back pressure chamber 17 of the poppet 14 when the second spool 3 is shifted; a second orifice 30 formed in a flow path 23 between the second spool 3 and a back pressure chamber 29 of the piston 13 and controlling the hydraulic fluid fed from the hydraulic pump 26 to the back pressure chamber 29 of the piston 13 when the second spool 3 is shifted; and a third orifice 31 installed in a flow path 16 having an inlet part connected to a flow path between the first spool 15 and the poppet 14 and an outlet part connected to the second spool 3, and controlling the hydraulic fluid fed from the hydraulic pump 26 to shift the second spool 3.

Figure 1:
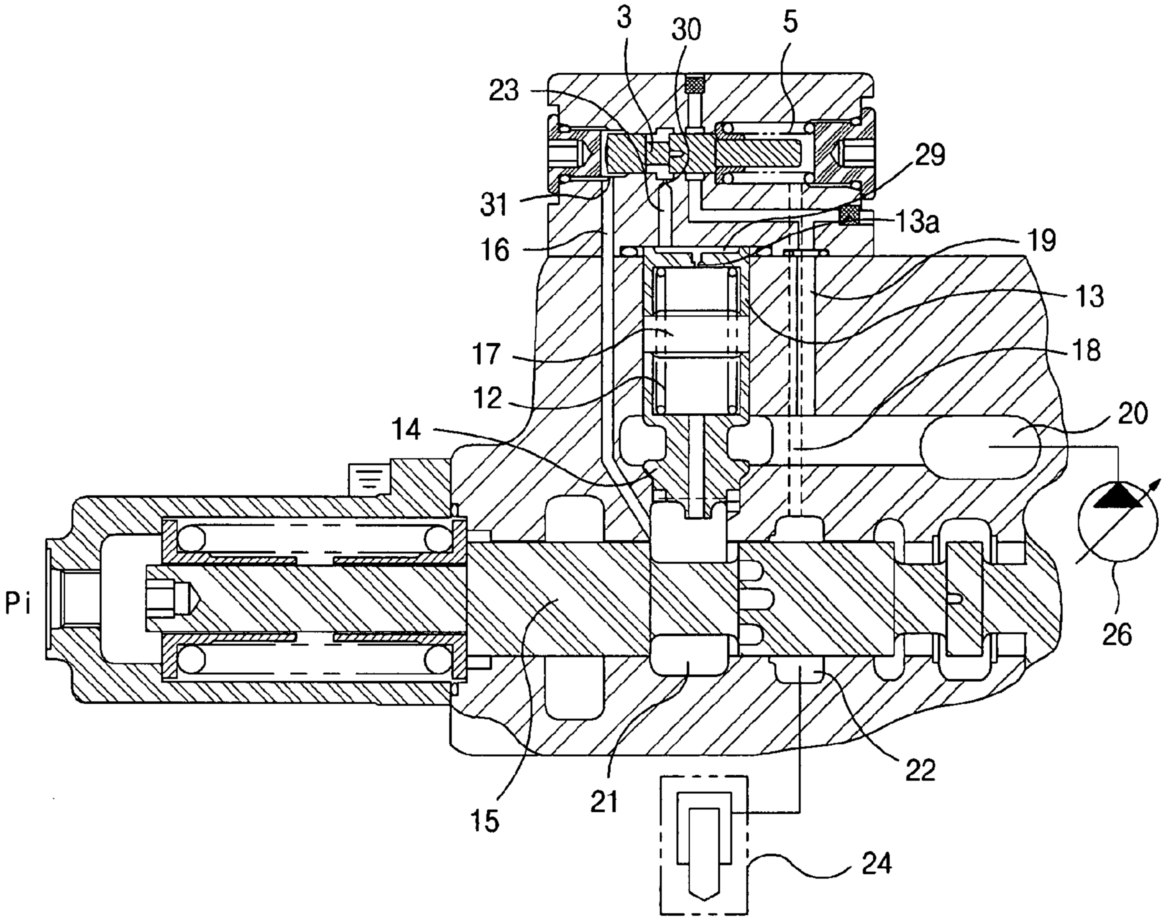
Fig. 1 Prior Art
FIG. 1 is a sectional view of a conventional hydraulic circuit of an option device for an excavator.
Figure 2:
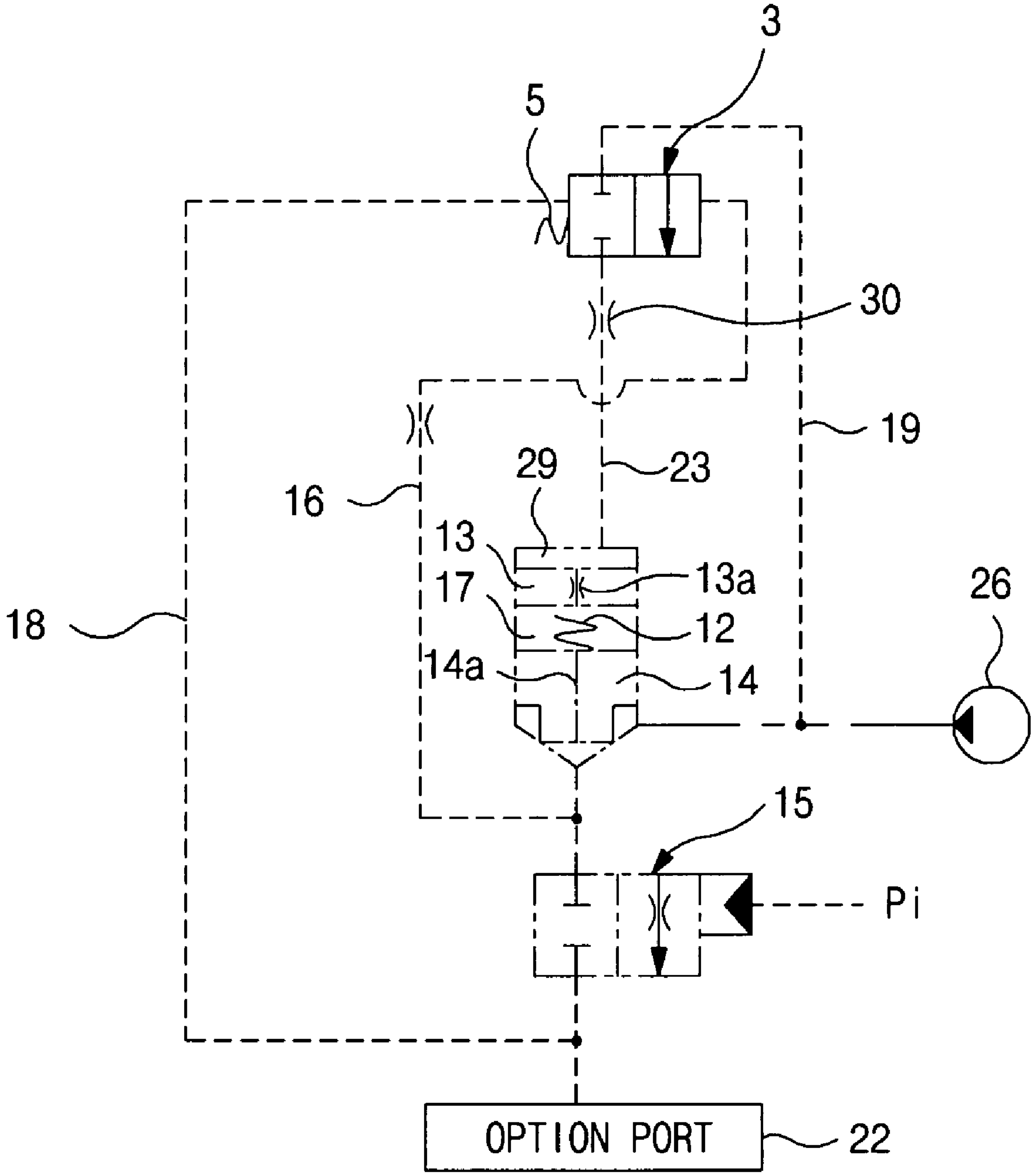
Fig. 2 Prior Art
FIG. 2 is a hydraulic circuit diagram of a conventional option device for an excavator.
Figure 3:
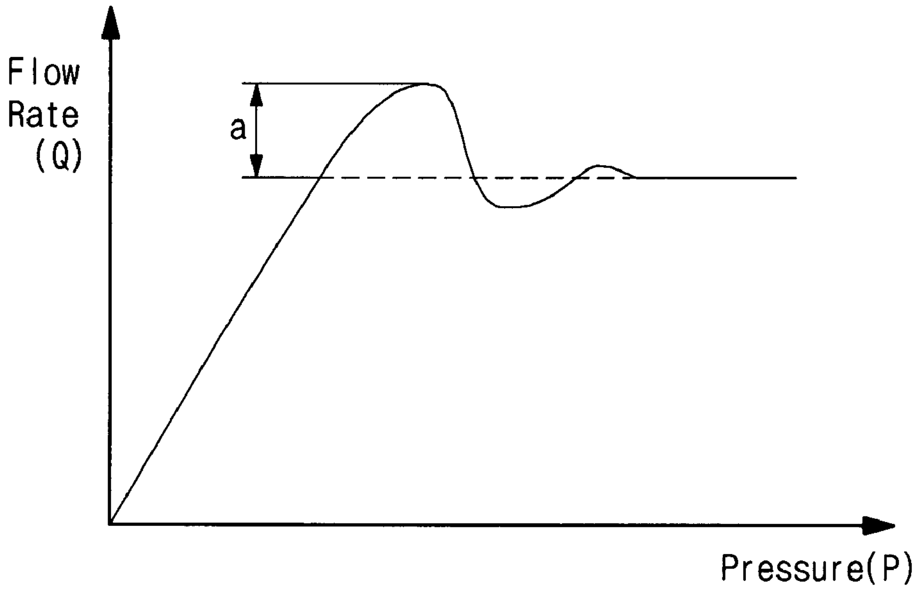
Fig. 3 Prior Art
FIG. 3 is a graph showing the control flow rate that is overshot in an initial control period of the conventional option device for an excavator.

In the whole description of the present invention, the same drawing reference numerals as illustrated in FIG. 1 are used for the same elements across various figures, and the detailed description thereof will be omitted.

Hereinafter, the operation of the hydraulic circuit of an option device for an excavator according to an embodiment of the present invention will be described with reference to the accompanying drawings.

As shown in FIG. 7, the hydraulic fluid fed from the hydraulic pump 26 is supplied to the supply line 20 and the pilot flow path 19. The hydraulic fluid fed to the supply line 20 pushes the poppet 14 upward as shown in the drawing. Simultaneously, the hydraulic fluid pushes the check valve 14*b* installed inside the orifice 14*a* of the poppet 14 upward, and moves the check valve up to the position of the shim 14*c*.

In this case, the hydraulic fluid fed to the back pressure chamber 17 of the poppet 14 is supplied to a chamber 21 through an orifice 14-2 of the check valve 14*b* installed inside the poppet 14. Accordingly, the poppet 14 is moved upward to be in contact with the piston 13 (in this case, the elastic member 12 is compressed).

Accordingly, the hydraulic fluid on the supply line 20 is supplied to the chamber 21. At this time, the hydraulic fluid moved to the chamber 21 is intercepted by the first spool 15 that is kept in a neutral state, and thus is not supplied to the option device 24.

When the pilot signal pressure 5*pa*4 is applied to the option spool 25, its inner spool is shifted in the left direction as shown in FIG. 7. Accordingly, the hydraulic fluid fed from the hydraulic pump 26 to the flow path 20-1 is intercepted by the shifted option spool 25, and the hydraulic fluid fed from the hydraulic pump 26 to the flow path 22 is supplied to the option device 24 via a flow path 5A4.

As shown in FIG. 6, in the case where the pilot signal pressure Pi is applied to the left port of the first spool 15, the first spool 15 is shifted in the right direction (while in FIG. 7, the first spool 15 is shifted in the left direction). The hydraulic fluid fed into the chamber 21 is supplied to the option device 24 via the option port 22, and thus the option device is driven.

That is, when the first spool 15 is shifted by the pilot signal pressure Pi, the cross-sectional area of a variable notch part 27 formed on the first spool 15 is varied depending on the movement of the first spool 15. Accordingly, the flow rate of the hydraulic fluid fed to the option device 24 through the first spool 15 can be controlled.

As shown in FIG. 6, when the hydraulic fluid fed from the hydraulic pump 26 is supplied to the option spool 25 via the first spool 15, a loss in pressure occurs between the chamber 21 and the option port 22 by the variable notch part 27 formed on the periphery of the first spool 15. In this case, if the flow rate of the hydraulic fluid fed from the chamber 21 to the option port 22 through the shifting of the first spool 15 is increased, the pressure loss is also increased.

At this time, the hydraulic fluid having the pressure that is increased through the shifting of the first spool 15 is supplied to the left end of the second spool 3 after passing through the third orifice 31 of the flow path 16 connected to the chamber 21. Accordingly, the second spool 3 is shifted in the right direction as shown in the drawing (while in FIG. 7, the second spool 3 is shifted in the left direction).

In this case, if it is assumed that the cross-sectional area of a diaphragm of the second spool is A1, a force that shifts the second spool 3 in the right direction is $(A1 \times P1)$.

The pressure in the option port 22 is applied to the right end of the second spool 3 after passing through the pilot flow path 18. Accordingly, the second spool 3 is shifted in the left direction as shown in FIG. 6 (while, in FIG. 7, the second spool 3 is shifted in the right direction). In this case, if it is assumed that the cross-sectional area of the diaphragm of the second spool 3 is A2, a force that shifts the second spool 3 in the left direction is $(A2 \times P2)+F1$ (which corresponds to the elastic force of the valve spring 5).

The condition that the second spool 3 is kept in its initial state, i.e., in its non-shifted state, (which corresponds to the state as shown in FIG. 6) is given as $(A1 \times P1)<((A2 \times P2)+F1)$.

By contrast, the condition that the second spool 3 is shifted in the right direction as shown in FIG. 6 is given as $(A1 \times P1)>((A2 \times P2)+F1)$.

In the case of shifting the second spool 3 in the right direction as shown in FIG. 6, the hydraulic fluid fed to the pilot flow path 19 connected to the supply line 20 is supplied to the back pressure chamber 29 of the piston 13 after passing through the second spool 3 and a through flow path 23 in order. Accordingly, the piston 13 is moved downward as shown in the drawing. Simultaneously, the poppet 14 elastically supported by the elastic member 12 is moved downward.

At this time, if the second spool 3 is shifted and the piston 13 is pressed by the hydraulic fluid fed from the hydraulic pump 26, the flow rate of the hydraulic fluid passing through the orifice 14*a* of the poppet 14 can be reduced by the shim 14*c* and the check valve 14*b* installed in the poppet 14.

That is, the hydraulic fluid fed from the back pressure chamber 17 passes in order through a through hole 14-3 formed on the shim 14*c* placed in the inlet part of the orifice 14*a* of the poppet 14 and an orifice 14-2 formed on the check valve 14*b* installed inside the orifice 14*a* of the poppet 14.

Accordingly, at an initial operation of the option device 24, the time when the hydraulic fluid fed from the back pressure chamber 17 passes through the orifice 14*a* of the poppet 14 and the flow rate of the hydraulic fluid passing through the orifice 14*a* can be reduced.

By the movement of the poppet 14, the flow path between the supply line 20 and the chamber 21 is blocked. AS the pressure in the flow path 16 is reduced, the second spool 3 is moved in the left direction as shown in FIG. 6. This corresponds to the condition given as $(A1\times P1)<((A2\times P2)+F1)$.

When the second spool 3 is shifted in the left direction as shown in the drawing, the supply of the pressure in the pilot flow path 19 to the through flow path 23 is intercepted. Accordingly, as the poppet 14 is moved upward as shown in the drawing, the hydraulic fluid fed from the hydraulic pump 26 is supplied to the left end of the second spool 3 via the supply line 20, the chamber 21 and the flow path 16.

This is, the condition that the second spool 3 is shifted in the right direction as shown in the drawing is given as $(A1\times P1)>((A2\times P2)+F1)$. Accordingly, the second spool 3 is shifted in the right direction as shown in the drawing.

Accordingly, as the repeated shifting of the second spool 3 is performed, the loss in pressure occurring between the chamber 21 and the option port 22 becomes constant.

Figure 4A:
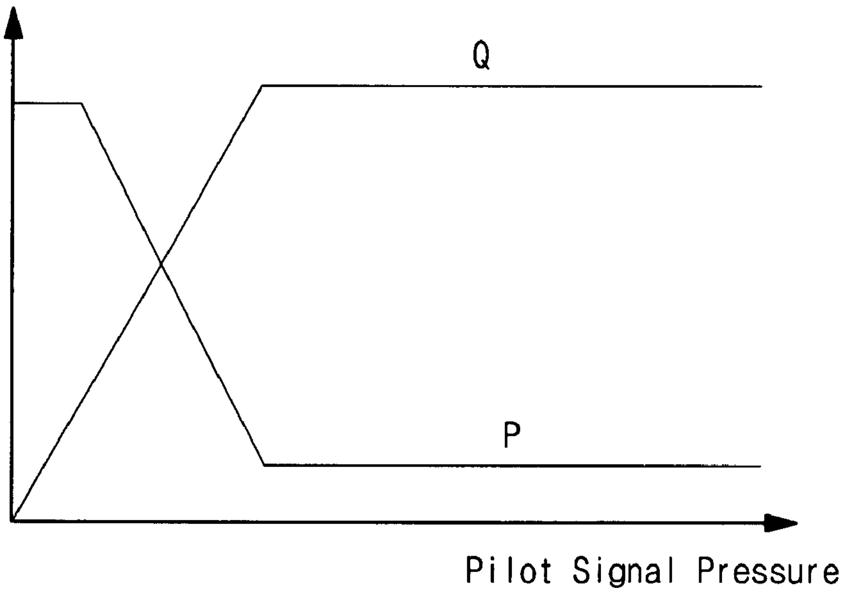
FIGS. 4A and 4B are graphs showing the flow rate change against pressure in the hydraulic circuit of an option device for an excavator.
Figure 4B:
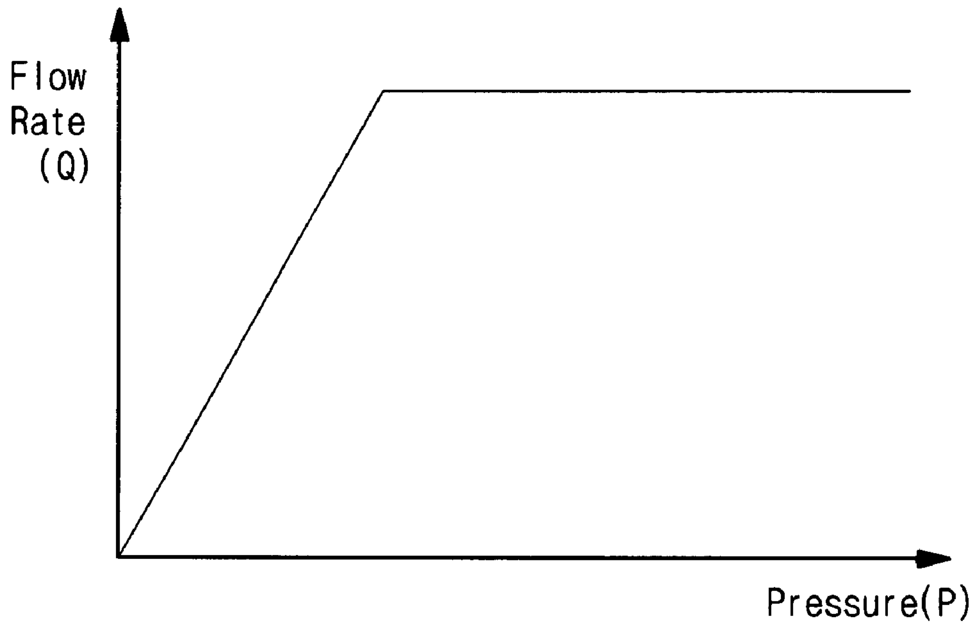

As illustrated in FIGS. 4A and 4B, it is known that the flow rate Q of the hydraulic fluid being supplied to the option device 24 is $Q=(Cd\times A\times \Delta P)$. Here, Q denotes the flow rate, Cd denotes a flow rate coefficient, A denotes an opening area of a spool (A=constant), and $\Delta P$ denotes a loss in pressure between P1 and P2 ($\Delta P$=constant).

As described above, when an excavator having option devices mounted thereon operates, the hydraulic fluid fed from the hydraulic pump 26 can be constantly supplied to the option device 24, irrespective of the size of a load occurring in the option device 24. Also, the flow rates required for various kinds of option devices can be respectively controlled. In addition, the flow rate of the hydraulic fluid being supplied to the option device 24 in an initial control period of the option device can be prevented from being overshot over the predetermined flow rate.

From the foregoing, it will be apparent that the hydraulic circuit of an option device for an excavator according to an embodiment of the present invention has the following advantages.

The hydraulic circuit can constantly supply the hydraulic fluid to the option device, irrespective of the size of a load of the option device, and thus the operation speed of the option device is kept constant to improve the manipulation. Also, the hydraulic circuit can respectively control the flow rates required for various kinds of option devices.

The hydraulic circuit can prevent the flow rate from being overshot in an initial control period of the option device, and thus the stability of the option device can be secured.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hydraulic circuit of an option device for an excavator, comprising:

a variable hydraulic pump;

an option device connected to the hydraulic pump;

a first spool installed in a first flow path between the hydraulic pump and the option device and shifted to control hydraulic fluid being supplied from the hydraulic pump to the option device in response to a first pilot signal pressure applied to the first spool;

a poppet installed to open/close the first flow path between the hydraulic pump and the first spool and controlling hydraulic fluid fed from the hydraulic pump to the option device when the first spool is shifted, and a piston elastically supported in a back pressure chamber of the poppet;

a second spool shiftable to control hydraulic fluid fed from the hydraulic pump to the back pressure chamber of the poppet via a through flow path connected to the back pressure chamber of the poppet, in response to a difference between a pressure of an inlet part of the first spool and a sum of a pressure of an outlet part of the first spool and an elastic force of a valve spring;

an option spool installed in a second flow path between the first spool and the option device and being shiftable to control hydraulic fluid fed to the option device via the first spool in response to second and third pilot signal pressures;

a first orifice formed in the piston and controlling the hydraulic fluid fed from the hydraulic pump to the back pressure chamber of the poppet when the second spool is shifted;

a second orifice formed in the through flow path between the second spool and the back pressure chamber of the piston and controlling the hydraulic fluid fed from the hydraulic pump to the back pressure chamber of the piston when the second spool is shifted; and a third orifice installed in a flow path having an inlet part connected to a flow path between the first spool and the poppet and an outlet part connected to the second spool, and controlling the hydraulic fluid fed from the hydraulic pump to shift the second spool; and a control means for controlling hydraulic fluid passing through an orifice of the poppet when the second spool is shifted and the piston is acted on by the hydraulic fluid fed from the hydraulic pump, through the shifting of the second spool such that during an initial control period of the option device, the flow rate of the hydraulic fluid fed from the back chamber of the poppet to the option device is prevented from being increased over a predetermined flow rate set by the control means, the control means including a shim placed on an inlet part of the orifice of the poppet and defining a hole formed in the center thereof to be connected to the orifice of the poppet, and an orifice check valve defining an orifice in the center thereof, installed inside the poppet, the flow rate of the hydraulic fluid passing through the orifice of the poppet and from the back chamber to the option device being reduced by the shim and the orifice check valve in the poppet.

2. A hydraulic circuit according to claim 1, wherein the orifice check valve is movable from a closed position to an open position adjacent to the shim such that the flow rate of the hydraulic fluid flowing from the orifice of the poppet toward the shim is increased.

3. A hydraulic circuit according to claim 1, wherein the orifice check valve includes radial openings connected to the orifice of the orifice check valve to permit flow of the hydraulic fluid from the orifice of the poppet through the radial openings and the orifice of the orifice check valve when the orifice check valve is in the open position.

* * * * *